United States Patent

Paine

[15] 3,648,516

[45] Mar. 14, 1972

[54] THIN-FILM GAUGE

[72] Inventor: T. O. Paine, Administrator of the National Aeronautics and Space Administrator with respect to an invention of Angus D. McRonald, 2363 Mountain Avenue, La Crescenta, Calif. 91214

[22] Filed: May 29, 1969

[21] Appl. No.: 828,920

[52] U.S. Cl. ............................................. 73/190 H
[51] Int. Cl. .............................................. G01k 17/00
[58] Field of Search ........................... 73/15, 190, 204

[56] References Cited

UNITED STATES PATENTS

| | | | |
|---|---|---|---|
| 2,412,471 | 12/1946 | Olson | 73/204 |
| 3,068,693 | 12/1962 | Ferran et al. | 73/204 |
| 3,367,182 | 2/1968 | Baxter | 73/15 |

OTHER PUBLICATIONS

Brown et al., " Steady-State Heat Flux Guage" In the Review of Scientific Instruments 32(8) pg. 984- 985, August 1961

Primary Examiner—Richard C. Queisser
Assistant Examiner—Herbert Goldstein
Attorney—J. H. Warden, Monte F. Mott and G. T. McCoy

[57] ABSTRACT

A thin-film gauge for use in measuring distributed, convective heat transfer rates occurring along given surfaces, particularly surfaces of test specimens disposed in the air stream of a wind tunnel, characterized by the utilization of a thin-film substrate and a plurality of painted platinum leads extending across the surface of the substrate including a pair of leads adapted to deliver an electrical current at a constant amperage through a selected thermally active area and a pair of leads coupled therewith at opposite sides of the thermally active area for detecting heat induced voltage drops occurring in the thermally active area so that the active length of the gauge is defined between the voltage output leads, whereby changes in heat transferred to the thermally active area are isolated and determined by detecting induced changes in voltage drop occurring therein.

1 Claim, 3 Drawing Figures

Patented March 14, 1972  3,648,516

ANGUS D. MC RONALD
INVENTOR

ATTORNEYS

THIN-FILM GAUGE

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to temperature measuring devices and more particularly to a thin-film gauge including an electrical resistance adapted to be mounted on a test specimen disposed within a wind tunnel and employed for determining heat transfer rates by detecting changes in voltage drops occurring across the resistance.

2. Description of the Prior Art

It is known that the electrical resistance of various types of metal varies in accordance with an occurrence of changes in temperature. This phenomenon has long been exploited in various types of temperature measuring gauges, since by supplying a constant current through the device, changes in voltage drop are proportional to temperature changes in the resistance of the device. However, where attempts have been made to employ this phenomenon in temperature gauges for acquiring measurements of distributed, convective heat transfer rates along the surface of test specimens mounted within wind tunnels, difficulty has been experienced in obtaining accurate readings, primarily because the gauges and their associated electrical leads tend to disturb the flow of the air stream, as the stream is directed across the surface of the specimen. Furthermore, the exposed portions of the leads absorb heat and therefore induce a detectable change in the total electrical resistance of the gauge circuit and consequently cause an erroneous reading to be provided at the output for the gauge.

OBJECTS AND SUMMARY OF THE INVENTION

This invention overcomes the aforementioned difficulty through the use of a circuit painted on the surface of a thin-film, dielectric substrate adapted to be mounted on a test specimen and including constant current electrical leads interconnected through a thermal detecting resistance, across which a voltage measuring device is connected so that an inexpensive and nonperturbating temperature gauge is provided for reporting an accurate readout corresponding to temperature changes.

An object of the instant invention is to provide an improved thin-film gauge for measuring convective heat transfer rates.

Another object is to provide a convective heat transfer rate measuring device for use in detecting and measuring changes in surface temperatures imparted to test specimens mounted in wind tunnels.

Another object is to provide an improved thin-film, electrical circuit adapted to employ an electrical current at constant amperages to indicate temperature changes occurring within selected, thermally active areas by detecting and providing output signals indicative of heat induced changes in circuit resistance as the changes occur within an electrical circuit component extended through the thermally active areas.

DESCRIPTION OF THE PREFERRED EMBODIMENT

Figure 1:
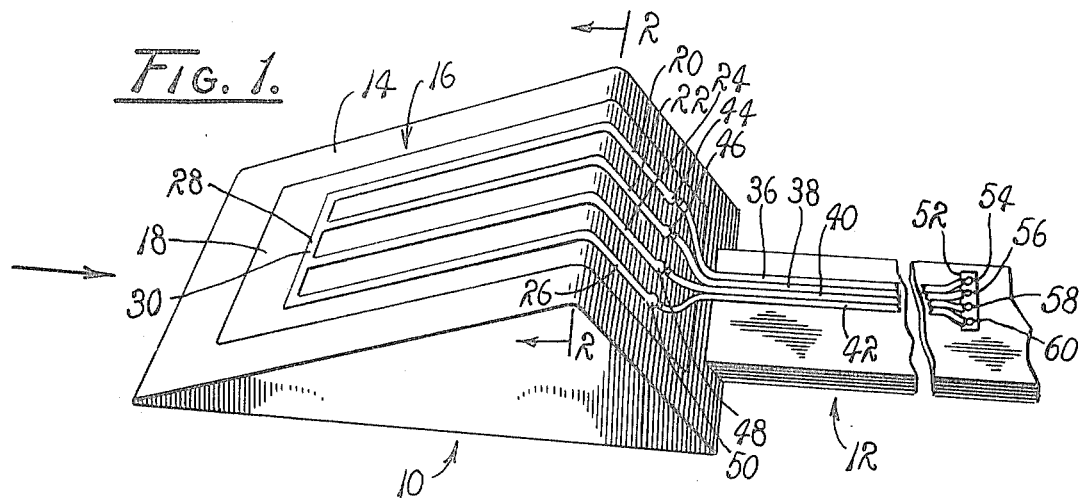
FIG. 1 is a perspective view of a test specimen mounted within a wind tunnel having a thin-film gauge of a type embodying the principles of the instant invention mounted along a surface thereof.

Referring now to FIG. 1, therein is illustrated a test specimen, generally designated 10. The specimen is supported in an air stream by means including a convenient mount 12. While not specifically illustrated, the mount 12 is of a type adapted to be arranged and supported within a wind tunnel of known design for purposes of supporting test specimens during investigation of effects of changing thermal conditions established incident to the direction of an accelerated or high velocity stream of air across the surface thereof. The shape of the test specimen is varied, as desired. However, it is intended that initiated temperature changes occurring at selected thermally active areas be detected with resulting electrical readout signals being provided and applied to convenient recording mechanisms, also not shown. Since the structure, function and purposes of wind tunnels, as well as the normally associated recording devices, are well understood, a detailed description thereof is omitted in the interest of brevity.

As illustrated, the specimen 10 to be examined is generally of a wedge-shaped configuration having a knife-edge leading portion 14 disposed in a flow-interrupting disposition within an air stream. Mounted on the surface of the specimen, adjacent to its knife-edge portion, there is arranged a thin-film gauge 16. While the gauge 16 is illustrated as a planar member, it is to be understood that it may be of any convenient configuration found desirable for various purposes, including the mounting thereof.

Figure 2:
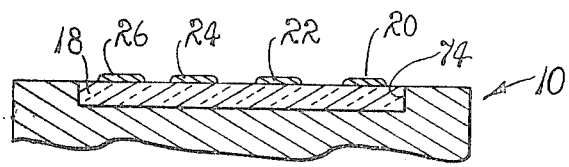
FIG. 2 is a fragmentary cross section taken generally along line 2—2 of FIG. 1.

As best illustrated in FIG. 2, the gauge 16 includes a thin-film substrate 18 formed of any convenient dielectric material, such as, for example, commercially available material commonly referred to as Pyrex. If desired, the substrate may be formed of flexible material whereby the mounting thereof is enhanced. Across the surface of the substrate 18 there is provided in physical parallelism a plurality of electrical conductor leads 20, 22, 24 and 26. The leads are applied to the substrate by employing convenient painted circuit fabrication techniques. In practice, the leads preferably are formed from platinum although other metallic materials may function quite satisfactorily. Since the painting of platinum leads to thin-film substrates involves well-known techniques, a detailed description thereof is omitted.

Near one end of the substrate 18, adjacent to the leading edge of the test specimen 10, there is provided an electrical conductor 28 which interconnects the leads 20 through 26. This conductor is formed in a manner similar to that in which the conductor leads 20 through 26 were formed. However, it is to be particularly noted that between the leads 22 and 24 the lead 28 includes a segment designated 30. It is intended that this segment be extended through the thermally active area of the surface to be sampled for determining convective heat transfer rates. While the leads 20 through 26 are illustrated as being equally spaced, it is to be understood that it is not at all necessary that they be so spaced and that the segment 30 be of any length desired in providing the desired detection and indication of heat transfer. However, it is important to note that the resolution of the gauge is enhanced by shortening this segment.

Figure 3:
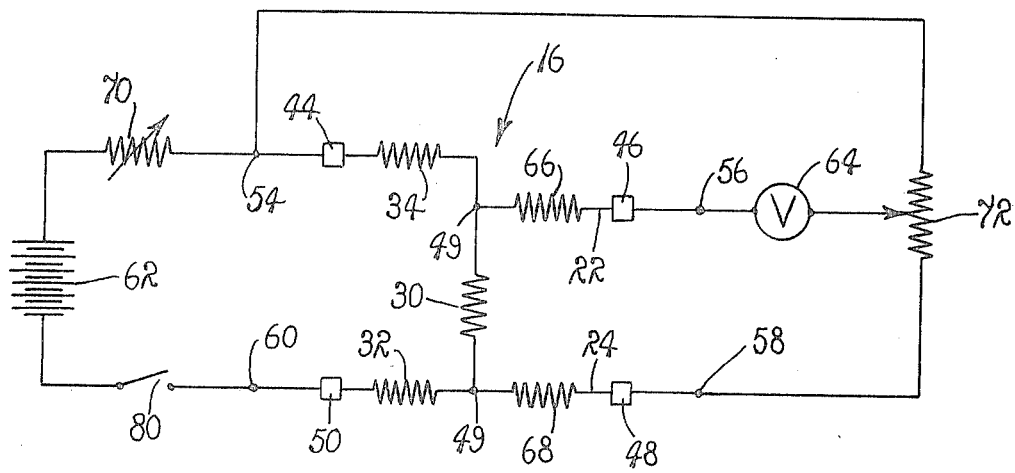
FIG. 3 is a circuit diagram of an electrical circuit of a type within which the gauge of FIGS. 1 and 2 may electrically be connected.

The segment, as best illustrated in FIG. 3, at any given instant, has an electrical resistance of an ohmic value determined by the quantity of heat delivered thereto. Therefore, as the temperature of the segment is varied, in response to a transfer of heat thereto, its resistance is varied. Consequently, by determining the value of the electrical resistance of the segment, its temperature becomes a known quantity, since for each value of resistance there is a corresponding temperature.

The leads 20 and 26, in effect, provide a path of relatively low resistance for a current of a constant amperage. The resistance of the leads schematically is represented, FIG. 3, by resistors 32 and 34. In practice, these leads are extended along the substrate 18 and terminate at points removed from the path of the stream of air flowing over the surface of the test specimen. This arrangement permits electrical connections to be made without disturbing the flow of air across the specimen. As shown, the conductor leads 20 through 26 are coupled with the electrical leads 36, 38, 40 and 42 at terminals 44, 46, 48 and 50, respectively. The leads 36 through 42 extend to a convenient terminal board 52 having mounted thereon a plurality of convenient electrical connectors, such as, for example, binding posts 54, 56, 58 and 60.

While a DC (Direct Current) source 62 of electrical potential serves to provide an electrical current at a constant amperage through the circuit of the gauge 16, various types of constant current sources are available and may be employed quite satisfactorily. Such sources include transistorized circuits of various and known types capable of delivering DC currents at given amperages. However, for purposes of explanation, the source 62 is a DC battery of a predetermined voltage rating.

With particular reference to FIG. 3, it will be noted that when the gauge 16 is activated, a current flow is established through the resistance 30, between the terminals 44 and 50, while a voltage pickoff is provided for the terminals 46 and 48. These terminals are connected with the lead 28 at the opposite sides of the resistance segment 30. A pair of terminals 49 diagrammatically represents the point of connection for the terminals 46 and 48.

The terminals 46 and 48 are, in turn, connected to opposite sides of a convenient voltage detecting device 64, illustrated as a conventional voltmeter. However, it should be fully appreciated that the function of the device 64 is to detect changes in voltage drop occurring across the resistance 30 and, therefore, various types of readily available voltage measuring devices, including oscilloscopes, may be employed.

The electrical resistance of the leads 22 and 24 are, for the sake of simplicity, illustrated as resistances 66 and 68, FIG. 3. Therefore, since the circuit of the gauge 16 includes a plurality of electrical resistances, a convenient variable, high-resistance resistor 70 is connected in the circuit in series with the circuit of the gauge for thereby assuring that a constant amperage is provided for the flow of current delivered through the gauge, in accordance with well-known principles of circuit design. In order to achieve an electrical balance for the voltmeter 64, as it is connected at the opposite sides of the segment 30, another variable resistance resistor 72 is provided and employed in coupling the voltmeter between the terminals 46 and 48.

Therefore, it should be apparent that as the source of DC potential 62, connected with the terminals 44 and 50, applies a voltage across the segment 30 a detectable voltage drop across the segment 30 occurs. However, this voltage drop is, in effect, isolated from the voltage drop occurring across the resistances 32 and 34 since the voltmeter will detect only the voltage drop occurring across the resistance of the segment 30.

Referring particularly to FIG. 2, it will be noted that the substrate 18 is illustrated as being inserted into a relief, designated 74, formed in the surface of the specimen 10. The purpose of inserting the substrate 74 to establish a coplanar relationship with the surface of the test specimen is to avoid perturbation of the flow of air across the specimen. Since the leads employed are relatively thin, perturbation is minimized.

It should, of course, be understood that the substrate 18 may be mounted on the surface of the test specimen 10 at any desired location and, due to the relatively small dimension of the thickness of the substrate, perturbation is for practical purposes often deemed negligible.

OPERATION

It is believed that in view of the foregoing description, the operation of the device will be readily understood and it will be briefly reviewed at this point. With the thin-film gauge 16 seated on or alternatively within a relief at a selected area to be investigated along the surface of a test specimen, in a manner such that the segment 30 extends through the thermally active area, the source of electrical potential 62 is connected across the segment at the terminals 44 and 50. The voltmeter 64 then is connected at opposite sides of the segment. The specimen 10 mounted on the support 12 operatively is arranged within a wind tunnel of a selected capability. As a high velocity stream of air is forced across the leading portion of the specimen, the temperature thereof is elevated. As the temperature of the specimen is elevated, a transfer of heat to the gauge 16 occurs, which heat is transmitted to the lead 28. As the temperature of the lead is elevated, the resistance of the segment 30 is increased. At various points in the testing cycle a reading is taken at the voltmeter to determine the voltage drop then occurring across the segment. This reading normally is taken by closing a convenient switch, such as switch 80, for a period of only a few milliseconds. The ohmic value of the voltage drop continues to increase as the temperature increases. For each change in the value of the voltage drop experienced, a known temperature value is assigned so that for any detected voltage drop, the temperature of the segment 30 is provided, whereby heat transfer rates are determined.

Although the invention has been herein shown and described in what is conceived to be the most practical and preferred embodiment, it is recognized that departures may be made therefrom within the scope of the invention.

What is claimed is:

1. In a heat transfer measuring system for use in measuring distributed, convective heat transfer rates at a selected surface of an aerodynamic body operatively supported within an air stream, a thin-film gauge comprising:

A. a substrate including a planar portion formed of a thin-film dielectric material and including a thermally active region configured to be seated in a recess formed in a selected surface of an aerodynamic body;

B. a pair of spaced electrical energy leads deposited on the substrate and extending along opposite edge portions thereof in spaced relationship with said thermally active region;

C. means remote from said thermally active region for connecting the leads across a source of electrical potential;

D. an electrical lead including a segment deposited on said planar portion and extending through the thermally active region of the gauge and electrically interconnecting the spaced input leads for conducting an electrical current through said thermally active region of the gauge;

E. a pair of voltage pickup leads deposited on said substrate, electrically connected with the segment adjacent opposite sides of said thermally active region and terminating at points remote therefrom;

F. a pair of voltage output terminals remotely related to said segment and electrically coupled with a voltage measuring device; and G. means electrically connecting the voltage pickup leads with the voltage output terminals, whereby as the temperature of the thermally active region is varied a change in electrical resistance is imparted to the segment, so that the resulting change in the voltage drop occurring across said segment is detected by said voltage measuring device in order that changes in the convective heat transfer rate may be determined.

* * * * *